Patented Oct. 22, 1935

2,018,473

UNITED STATES PATENT OFFICE

2,018,473
PROCESS OF OBTAINING BERYLLIUM AND ALUMINUM COMPOUNDS

Charles B. Sawyer and Bengt Kjellgren, Cleveland Heights, Ohio, assignors to The Brush Beryllium Company, Cleveland, Ohio, a corporation of Ohio No Drawing. Original application October 14, 1930, Serial No. 488,662, now Patent 1,823,864, September 15, 1931. Divided and this application May 11, 1931, Serial No. 536,518. In Canada January 6, 1927

15 Claims. (Cl. 23—18)

This invention relates to a process of separating beryllium sulphate from mixtures thereof with other salts. The process has been developed more particularly in connection with the recovery of beryllium from the ore beryl and the present application is a division of our earlier copending application Serial No. 488,662, filed October 14, 1930 (Patent No. 1,823,864, granted September 15, 1931), which constitutes a continuation in part of our earlier filed applications Serial No. 5,169, filed January 27, 1925, and Serial No. 123,593, filed July 19, 1926. Our entire process of recovering the beryllium from the ore comprises two main stages, namely, (1) the conversion of the beryllium and aluminum naturally occurring in the ore into soluble salts of said metals and (2) the treatment of said salts to effect the separation of the beryllium from the aluminum and other constituents. Our Patent No. 1,823,864 relates to the first stage of the entire process and the present invention has to do with the second stage, although it is to be understood that it is not limited in its application to the recovery of beryllium from its ores.

An object of the invention is to provide a process of separating beryllium sulphate from mixtures thereof with aluminum and other sulphates by which beryllium salts of a high degree of purity can be produced.

A further object of the invention is the provision of a process particularly adapted to the separation of beryllium sulphate from mixtures thereof with aluminum and other sulphates as obtained by sulphatizing ores of beryllium, such as beryl.

Other objects of the invention will be apparent to those skilled in the art from the description of it hereinafter given.

In our process of recovering the beryllium content from the ore beryl, as set forth in our Patent No. 1,823,864, the beryl preferably is treated to render it more susceptible to attack by reagents, such as sulphuric acid. This is accomplished by heating the beryl above 1000° C., and preferably to the melting point, and then rapidly cooling, as by quenching in water. When the thus modified beryl is treated with sulphuric acid, sulphates of all the basic oxides present in the ore are formed, such as beryllium, aluminum, iron and alkali sulphates. In the following description it will be assumed, by way of example, that such a mixture of sulphates is to be treated by the process constituting the present application.

After treatment of the modified beryl with sulphuric acid we prefer to extract the sulphates from the sulphated material so as to make an aqueous solution of the sulphates. From this solution the aluminum sulphate may be completely separated by converting it into an alum, for example ammonia alum, by adding a sufficient amount of ammonium sulphate, and subsequently removing the alum by crystallization. It has been known that a major portion of the aluminum can be separated from the other sulphates as an alum, but heretofore it has never been possible to secure a complete separation. According to the present invention a complete separation is attained by either of two methods, both of which are based on the discovery that an alum, such for example as ammonia alum or potassium alum, is substantially insoluble in an aqueous solution containing a mixture of beryllium sulphate and an alkali sulphate, such for example as ammonium sulphate or potassium sulphate, provided that the concentration of the solution with respect to both the beryllium sulphate and the alkali sulphate is sufficiently high at the temperature of the solution. A saturated solution of beryllium sulphate dissolves some ammonia alum at room temperature. If, however, ammonium sulphate is added the solubility of ammonia alum in this solution rapidly decreases and is practically zero at about 18° C. (room temperature), when the amount of ammonium sulphate approaches about 6% of the weight of beryllium sulphate ($BeSO_4 \cdot 4H_2O$) in solution. If the beryllium sulphate solution is not saturated a greater amount of ammonium sulphate has to be added. Also if the temperature of the beryllium sulphate solution is increased, more ammonium sulphate has to be added.

In one of the two above-mentioned methods of carrying out the present invention, the ammonium sulphate is added in suitable excess to the solution of mixed sulphates and the solution is concentrated to such a degree that the ammonia alum formed and separated by crystallization is insoluble in the remaining mother liquor, from which the alum is readily separated, for example, by filtration. For practical purposes it is preferable, in forming the alum, to dissolve in the aqueous solution containing the beryllium and aluminum sulphates an excess amount of ammonium sulphate equal to 10-20% of the weight of the beryllium sulphate ($BeSO_4 \cdot 4H_2O$) present in the solution in order to secure a suitably wide usable range of concentrations and temperatures. If the excess amount of ammonium sulphate used be less than about 6% of the weight of the crystalline beryllium sulphate the alum may still be substantially completely separated by cooling the solution to temperatures lower than ordinary room temperatures. On the other hand it is possible to use very high percentages of ammonium sulphate (limited, obviously, by the solubility of the alkali sulphate in the beryllium sulphate solution), but it is, of course, preferable to use as little ammonium sulphate as is practically possible. Obviously, any predetermined high degree of separation less than complete separation, as well as complete separation, of the aluminum sulphate (as alum) from the beryllium sulphate, can be effected by adjusting the concentration, or temperature, or both concentration and temperature, of the solution containing the three mixed sulphates.

If the fullest benefit of the invention is sought, the concentration of the beryllium-aluminum sulphate solution with respect to beryllium sulphate should be such on cooling after the addition of the excess alkali sulphate as to closely approach the saturation point, and practically this can readily be insured by so adjusting the specific gravity of the beryllium-aluminum sulphate solution that on cooling after addition of the excess alkali sulphate a small amount of beryllium sulphate is crystallized out with the alum.

The second of the two above-mentioned methods for carrying out the invention is similar to the first method except that use is made of an alternative procedure for the separation of the beryllium sulphate from the alum. In this second procedure the beryllium-aluminum sulphate solution is treated with an amount of ammonium sulphate sufficient to form an alum. After the addition of the alkali sulphate the solution is further concentrated until a mixture of beryllium sulphate and alum crystals is obtained, for example by cooling. The mixture of crystals is further separated by filtration and then is leached with a solution of beryllium sulphate and ammonium sulphate, the ammonium sulphate being used in an amount depending upon the concentration and temperature of the leaching solution and corresponding to the excess amount of ammonium sulphate added to the mixture of beryllium and aluminum sulphates in the first described method. Such a leaching solution may contain, for example, 250 grams of beryllium sulphate ($BeSO_4 \cdot 4H_2O$) per liter and 60 grams of ammonium sulphate per liter. A solution of this concentration is capable of extracting about 570 grams of beryllium sulphate per liter at 20° C. from a mixture of beryllium sulphate and alum without dissolving the alum. After extraction, the solution thus contains 820 grams of beryllium sulphate and 60 grams of ammonium sulphate, the latter corresponding to an excess of 7.3% of the weight of the beryllium sulphate ($BeSO_4 \cdot 4H_2O$)

in solution.

The leaching process is carried out by stirring the mixed crystals preferably at room temperature or lower temperatures with the leaching solution. By this treatment all of the beryllium sulphate crystals are dissolved and the ammonia alum crystals left. The ammonia alum is further separated from the solution by filtration or otherwise and the beryllium sulphate in the filtrate recovered by evaporation and crystallization. The remaining mother liquor containing ammonium and beryllium sulphates may then be used again for leaching purposes after proper dilution with water.

It will, of course, be understood that in the use of the leaching solution in the second method the interdependent relations between the concentration of the leaching solution with respect to beryllium, the excess of alkali sulphate and the temperature at which the leaching solution is used have the same significance as in the case of the first method and the concentration of the leaching solution with respect to the beryllium sulphate content is to be adjusted in relation to the excess of alkali sulphate and the temperature in accordance with the principles above explained.

By such adjustment of the concentration, excess of alkali sulphate and temperature in carrying out our process by either method of procedure, we are enabled to effect a substantially complete separation of the aluminum sulphate from the beryllium sulphate, whereas in prior methods known to us in which the aluminum sulphate is separated from the beryllium sulphate in the form of an alum the said separation has been far from complete. Furthermore, as has been indicated, our improved method can be employed not only to effect complete separation of the aluminum sulphate from the beryllium sulphate, but also to effect any predetermined high degree of separation less than complete separation yet substantially greater than has been attained by prior methods.

After separating the ammonia alum by either of the above procedures, the solution contains a mixture of beryllium, ammonium, iron and possibly alkali sulphates. The beryllium sulphate may be separated from this solution by crystallization. To permit such crystallization to the best advantage, the solution should have the iron present in its ferrous condition. And if the iron is not so reduced, it should be reduced at this point by any well known process, such as the introduction of sulphur dioxide or barium sulphide.

The mother liquor from the alum crystallization can be concentrated to such degree that on cooling, beryllium sulphate readily crystallizes out in substantially pure form, leaving any iron or other impurities in solution. However, if much iron is present it may be necessary, in order to secure the pure salt, to recrystallize the beryllium sulphate, as by redissolving it in sulphuric acid in such concentration as to keep the iron in the solution, whereupon pure beryllium sulphate can be crystallized out. The solution remaining from this recrystallization of the beryllium sulphate can be reused until the iron content becomes too high for the purification of the beryllium sulphate, when the solution may be added to the previous mother liquor and the iron removed therefrom.

It will be seen that whichever of the two procedures for separating the alum is used, there is involved essentially the use of a solution of beryllium sulphate and an alkali sulphate which contains a sufficient amount of alkali sulphate and which is sufficiently concentrated with respect to the beryllium sulphate to render the alum insoluble to any predetermined high degree in the said solution.

The iron which remains in the mother liquor from the beryllium crystallization may be largely removed therefrom in any one of several ways, such as, for example, by further concentration of the mother liquor and crystallizing out of iron sulphate.

The final mother liquor remaining from the iron crystallization contains substantially all the excess free acid and is sufficiently reduced in iron content to permit its use as a reagent for subsequent treatment of additional beryl.

If the sulphate solution obtained by leaching the ore contains much free acid, ammonia may be added instead of ammonium sulphate. It will thus be seen that by the use of ammonia the excess sulphuric acid may be recovered as ammonium sulphate and thereby utilized in the process for the formation of ammonia alum.

The beryllium sulphate produced by our above described method can be decomposed into sulphur trioxide and beryllium oxide by heating to temperatures such as 800° to 1000° C. The sulphur trioxide may be converted to sulphuric acid for use in the process. Also the ammonia alum produced in the process may be decomposed into ammonium sulphate and aluminum sulphate, for example, by the process disclosed in U. S. patent to Kjellgren No. 1,752,599, thereby the ammonium sulphate used for separating the aluminum as ammonia alum being recovered. The aluminum sulphate produced in this manner may in turn be decomposed into aluminum oxide and sulphur trioxide in the same manner as the beryllium sulphate. If desired, the mixture of crystals of beryllium sulphate and ammonia alum may be converted into a mixture of oxides of beryllium and aluminum.

As illustrating the character of our process we give the following specific example, in which sulphuric acid is employed as reagent:

100 lbs. of beryl, which has been melted and quenched as above explained (and more fully set forth in our Patent No. 1,823,864) and ground to pass a Tyler 200-mesh sieve, is mixed with 120 lbs. 63° Bé. sulphuric acid, which is about 10% excess of the acid. The mixture is then heated in an iron container. As soon as the acid becomes slightly warm the reaction starts, and the temperature increases rapidly. Steam and gases go off, and the mixture seems to boil. After about ½ hour the reaction slows down. The container is then covered and heated up to 250–300° C. for about 24 hours, to dehydrate the silica formed. After cooling, the white sulphated material is broken up in lumps and leached with water. The insoluble residue is separated by filtration and the filtrate concentrated to a specific gravity of about 1.32 at 20° C.

The filtrate or solution now has a volume of about 117 liters, and contains about:

| | Grams |
|---|---|
| BeO per liter | 35 |
| $Al_2O_3$ per liter | 49 |
| $Fe_2O_3$ per liter | 3 | in the form of sulphates.

The extracted yield of beryllium oxide is about 90%.

In order to separate the aluminum from the beryllium, ammonium sulphate is added to the solution, and ammonia alum separated by crystallization. The solution above contains 5740 grams $Al_2O_3$ as aluminum sulphate. It would require 7400 grams ammonium sulphate to form ammonia alum. However, about 25% excess ammonium sulphate or 9400 grams, is used. It may be dissolved in water to a saturated solution and added directly to the cold sulphate solution. The ammonia alum crystallizes quickly and, after equilibrium is reached between the crystallization and the mother liquor, is separated by filtration.

The mother liquor has a volume of about 104 liters and a specific gravity of about 1.21 at 15° C. It contains about:

| | Grams |
|---|---|
| BeO per liter | 33 |
| $Al_2O_3$ per liter | 3.2 |
| $Fe_2O_3$ per liter | 2.9 |
| Free $(NH_4)_2SO_4$ per liter | 19 |

The acidity of the solution is 0.15 to 0.20 normal in sulphuric acid.

For removal of the last part of the aluminum present, this mother liquor is concentrated to a specific gravity of 1.32 at boiling temperature, or to a volume of about 60 liters, and then crystallized by cooling to room temperature. The crystals consisting of ammonia alum and some beryllium sulphate are separated by filtration. The filtrate has a specific gravity of about 1.30 at 20° C. and contains about:

| | Grams |
|---|---|
| BeO per liter | 73 |
| $Fe_2O_3$ per liter | 10 | in the form of sulphates, and is now free from aluminum according to test carried out by the 8-hydroxyquinoline (in German 8-oxychinolin) separation method by Berg, (Zeitschrift analytische Chemie, 70, 341 (1927)) as modified by Kolthoff and Sandell (Journal American Chemical Society, 50, 1900 (1929)).

For separation of the beryllium from the iron the filtrate is concentrated to about 1.45–1.46 specific gravity at boiling temperature, and the solution crystallized by cooling, having preferably first reduced the iron with sulphur dioxide. The crystals formed contain .01% of $Fe_2O_3$. By recrystallization of the beryllium sulphate formed, the iron content of the crystals is only .002 to .003%. In other words, the beryllium sulphate is practically chemically pure.

It is noted that, in the carrying out of the separation of the aluminum sulphate from the beryllium sulphate, the degree of acidity of the solution remaining after the first crystallization of the ammonia alum is a matter of substantial practical importance. For one thing the presence of sulphuric acid in the solution affects the specific gravity of the solution and therefore when the solution is adjusted to any particular specific gravity the concentration of the solution with respect to beryllium sulphate and ammonium sulphate will depend upon the amount of acid present. Again, the acidity of the solution affects the solubility of the beryllium sulphate and, obviously, such acidity therefore should not be great enough to decrease the solubility of the beryllium sulphate to a point seriously affecting the recovery of the beryllium.

To those skilled in the art it will be apparent that our invention can be practiced with a variety of modifications and in various differing embodiments without departing from the spirit and scope thereof as defined in the appended claims.

What we claim is:

1. The process of recovering beryllium sulphate from a mixture of beryllium and aluminum sulphates by converting the aluminum sulphate of the mixture with an alkali sulphate to an alum and effecting separation of the alum in a solution of beryllium sulphate and an alkali sulphate, characterized by adjustment of the concentration of the said solution with respect to beryllium sulphate to or sufficiently close to saturation to prevent said solution from holding in solution more than any predetermined small amount of alum at the final temperature at which the alum is separated.

2. The process of producing a beryllium sulphate solution from a solution containing a mixture of beryllium and aluminum sulphates by dissolving in the latter solution an alkali sulphate in excess of the amount necessary to convert the aluminum sulphate of the solution to alum and separating the alum so formed, characterized by adjustment of the concentration of the solution containing the three mixed sulphates with respect to beryllium sulphate to or sufficiently close to saturation to secure by crystallization of the alum any predetermined high degree of separation of the aluminum from the beryllium.

3. The process of producing a beryllium sulphate solution from a solid mixture of beryllium sulphate and an aluminum alum by leaching the solid mixture with a solution of beryllium sulphate and an alkali sulphate to dissolve the beryllium sulphate and separate the alum, characterized by adjustment of the concentration with respect to beryllium sulphate of the solution resulting from the leaching to or sufficiently close to saturation to prevent said solution from finally dissolving more than any predetermined small amount of the alum.

4. The process as in claim 2 characterized by the use of an excess of the alkali sulphate of from about 6% to about 20% by weight of the beryllium sulphate ($BeSO_4 \cdot 4H_2O$) present in the solution.

5. The process as in claim 2 characterized by the determination of the excess amount of the alkali sulphate used according to the temperature at which the alum is crystallized and separated, the amount of the excess being increased with increase of the said temperature and decreased with decrease of said temperature.

6. The process as in claim 2 characterized by the fixing of the excess amount of the alkali sulphate used between about 6% and about 20% by weight of the beryllium sulphate ($BeSO_4 \cdot 4H_2O$) present in the solution according to the temperature at which the alum is crystallized and separated, the amount of the excess being increased with increase of the said temperature and decreased with decrease of said temperature.

7. The process as in claim 2 characterized by adjustment of the concentration of the solution containing the three mixed sulphates to saturation with respect to the beryllium sulphate at the temperature employed for crystallization and separation of the alum.

8. The process as in claim 2 characterized by the use of an excess of the alkali sulphate of from about 6% to about 20% by weight of the beryllium sulphate ($BeSO_4 \cdot 4H_2O$) present in the solution and by adjustment of the concentration of the solution containing the three mixed sulphates to saturation with respect to the beryllium sulphate at the temperature employed for crystallization and separation of the alum.

9. The process as in claim 3 characterized by the use of an amount of alkali sulphate in the leaching solution of from about 6% to about 20% by weight of the beryllium sulphate $BeSO_4 \cdot 4H_2O$) present in the solution obtained by the leaching.

10. The process as in claim 3 characterized by the determination of the amount of the alkali sulphate used in the leaching solution according to the temperature at which the leaching is carried out, the amount of the alkali sulphate being increased with increase of the said temperature, and decreased with decrease of said temperature.

11. The process as in claim 3 characterized by the fixing of the amount of alkali sulphate used in the leaching solution between about 6% and about 20% by weight of the beryllium sulphate ($BeSO_4 \cdot 4H_2O$) present in the solution obtained by leaching according to the temperature at which the leaching is carried out, the amount of the alkali sulphate being increased with increase of the said temperature, and decreased with decrease of said temperature.

12. The process as in claim 3 characterized by adjustment of the concentration of the solution obtained by leaching to saturation with respect to the beryllium sulphate.

13. The process as in claim 3 characterized by the use of an amount of alkali sulphate in the leaching solution of from about 6% to about 20% by weight of the beryllium sulphate ($BeSO_4 \cdot 4H_2O$)

present in the solution obtained by leaching and by adjustment of the concentration of the leaching solution to saturation with respect to the beryllium sulphate.

14. The process of separating the beryllium and aluminum contents of beryl ore containing iron, comprising treating the beryl with sulphuric acid, extracting the sulphates from the sulphated material, adding ammonia to the solution in the presence of an excess of sulphuric acid, crystallizing the aluminum as ammonia alum, concentrating the resulting solution, crystallizing the beryllium as a sulphate, again concentrating the solution, and crystallizing the iron as a sulphate, whereby the remaining acid solution may be re-used in the process.

15. In the process of obtaining beryllium sulphate from a solution containing beryllium sulphate and ferric iron sulphate, the steps which comprise reducing the iron to a ferrous condition, and crystallizing substantially pure beryllium sulphate from the solution.

CHARLES B. SAWYER.
BENGT KJELLGREN.